(12) United States Patent
Kanemitsu et al.

(10) Patent No.: US 6,745,453 B1
(45) Date of Patent: Jun. 8, 2004

(54) RIM ROLLING METHOD, PREFORMING ROLLER DIE USED FOR THE METHOD, AND METHOD OF MANUFACTURING BRAKE SHOE

(75) Inventors: Toshiaki Kanemitsu, Akashi (JP); Shuji Kanemitsu, Akashi (JP)

(73) Assignee: Kanemitsu Corporation (JP)

( * ) Notice: Subject to any disclaimer, the term of this patent is extended or adjusted under 35 U.S.C. 154(b) by 63 days.

(21) Appl. No.: 09/926,208

(22) PCT Filed: Jun. 26, 2000

(86) PCT No.: PCT/JP00/04162
§ 371 (c)(1),
(2), (4) Date: Sep. 25, 2001

(87) PCT Pub. No.: WO01/58619
PCT Pub. Date: Aug. 16, 2001

(30) Foreign Application Priority Data

Feb. 14, 2000 (JP) ........................ 2000-034843

(51) Int. Cl.[7] ................................................ B23P 15/00
(52) U.S. Cl. .................................... 29/557; 892/412
(58) Field of Search ................ 29/892.2, 892, 29/894.35, 894.354, 412, 557; 72/71, 82

(56) References Cited

U.S. PATENT DOCUMENTS

| | | | |
|---|---|---|---|
| 3,540,395 A | | 11/1970 | Skinner |
| 5,233,857 A | * | 8/1993 | Magnoni ............ 29/892.2 |
| 5,440,796 A | * | 8/1995 | Deggau et al. ........ 29/892.2 |
| 5,904,060 A | * | 5/1999 | Kanemitsu et al. ...... 72/110 |
| 6,012,318 A | * | 1/2000 | Kanemitsu et al. ........ 72/71 |
| 6,016,602 A | * | 1/2000 | Kanemitsu et al. ..... 29/893.32 |
| 6,484,547 B1 | * | 11/2002 | Kanemitsu et al. ........ 72/71 |
| 6,536,253 B1 | * | 3/2003 | Kanemitsu et al. ........ 72/71 |

FOREIGN PATENT DOCUMENTS

| | | |
|---|---|---|
| JP | 2-107858 | 4/1990 |
| JP | 2520095 | 5/1996 |
| JP | 11-104771 | 4/1999 |

* cited by examiner

*Primary Examiner*—I Cuda Rosenbaum
(74) *Attorney, Agent, or Firm*—Bacon & Thomas, PLLC; Felix J. D'Ambrosio

(57) ABSTRACT

The present invention provides a rim rolling method in which slotting can be correctly performed at an arbitrary position in the thickness direction of an outer peripheral face of a blank. A preforming roller die 7 is prepared in which a groove 8 is formed in an outer peripheral face 7a in the circumferential direction, and a groove forming blade portion 9 is protruded in the circumferential direction on an inner bottom portion of the groove 8. A preforming process is performed in which the groove 8 and the groove forming blade portion 9 of the preforming roller die 7 are pressed against an outer peripheral portion 10 of a disk-like metal blank 1, to form an outer peripheral groove 11 in the whole outer peripheral portion of the blank 1 by the groove forming blade portion 9. Thereafter, an expandingly forming roller die 12 in which an expanding blade portion 13 is protruded in the circumferential direction on an outer peripheral face 12a in the circumferential direction is pressed at the expanding blade portion 13 against the outer peripheral groove 11 of the blank 1, whereby rims 15a, 15b are expandingly formed while slotting the outer peripheral portion 10 of the blank 1 into two parts in the thickness direction.

3 Claims, 8 Drawing Sheets

RIM ROLLING METHOD, PREFORMING ROLLER DIE USED FOR THE METHOD, AND METHOD OF MANUFACTURING BRAKE SHOE

TECHNICAL FIELD

The present invention relates to a rim rolling method in which a disk-like blank is used and a rim is formed by rolling on an outer peripheral portion of a web, a preforming roller die which is to be used in the rolling method, and a method of producing a brake shoe by using the rolling method.

BACKGROUND ART

As a method in which, during production of a sheet metal V-pulley, a disk-like blank is used and a rim is formed by performing a rolling process on an outer peripheral portion of a web, for example, a rolling method is disclosed in Japanese Patent No. 2520095. In the rim rolling method, the outer peripheral portion of a disk-like metal blank is slit in the thickness direction into two parts by a slitting roller die, thereby expandingly forming a rim. In the slitting roller die used in the method, an edge-like blade portion protrudes in the circumferential direction in an axial center portion of the outer peripheral face. While pressing the edge-like blade portion against a center portion in the thickness direction of the outer peripheral face of the blank, the slitting roller die and the blank are synchronously rotated, whereby the outer peripheral portion of the blank is slit in the thickness direction into two parts so that a rim is annularly expandingly formed.

In the above-mentioned rim rolling method in which the slitting roller die is pressed against the outer peripheral face of the blank from the beginning, the edge of the blade portion of the slitting roller die easily slips over the outer peripheral face of the blank in the thickness direction during an initial stage of the slitting process, and hence it is not easy to slit the outer peripheral face of the blank at an arbitrary position in the thickness direction. In the case where a thin blank is used, particularly, instability and difficulty of centering and equal slitting in the process of slitting a center portion in the thickness direction of the outer peripheral face of the blank are conspicuous.

SUMMARY OF THE INVENTION

Therefore, it is an object of the invention to provide a rim rolling method in which slitting can be correctly performed at an arbitrary position in the thickness direction of an outer peripheral face of a blank. It is also an object of the invention to provide a preforming roller die which is to be used in the rim rolling method. It is a still further object of the invention to provide a method of producing a brake shoe by using the rim rolling method.

The rim rolling method includes: a preforming step of forming an outer peripheral groove in the entire outer peripheral portion of a disk-like metal blank; and an expandingly forming step of expanding the outer peripheral groove of the blank in a thickness direction to form a rim. In the preforming step, a preforming roller die is used in which a groove having a width that is larger than the thickness of the blank is formed in an outer peripheral face in a circumferential direction and a groove forming blade portion protrudes in the circumferential direction on an inner bottom portion of the groove, and the groove and the groove forming blade portion of the preforming roller die are pressed against an outer peripheral portion of the blank to form the outer peripheral groove in the entire outer peripheral portion of the blank by the groove forming blade portion. In the expandingly forming step, an expandingly forming roller die is used in which an expanding blade portion protrudes from an outer peripheral face in a circumferential direction, and the expanding blade portion of the expandingly forming roller die is pressed against the outer peripheral groove of the blank, whereby the outer peripheral portion of the blank is slit in the thickness direction into two parts to expandingly form a rim.

According to the rim rolling method, in advance of the process of slitting the outer peripheral portion of the blank in the thickness direction into two parts by the expandingly forming roller die to expandingly form a rim the preforming roller die is used which has the groove and the groove forming blade portion in the outer peripheral face, and the groove and the groove forming blade portion of the preforming roller die are pressed against the outer peripheral portion of the blank, so that the outer peripheral groove is formed in the entire outer peripheral portion of the blank by the groove forming blade portion. During the expandingly forming process, therefore, the expanding blade portion of the expandingly forming roller die can be pressed against the outer peripheral groove without slipping over the outer peripheral face of the blank. When the groove forming blade portion is disposed in the groove of the preforming roller die so as to correspond to a desired slitting position of the outer peripheral face of the blank, consequently, slitting can be correctly performed at an arbitrary position in the thickness direction of the outer peripheral face of the blank.

In the preforming step, at the same time when the outer peripheral groove is formed in the entire outer peripheral portion of the blank by pressing the groove and the groove forming blade portion of the preforming roller die, the outer peripheral portion of the blank may be thickened in the groove. According to this configuration, a rim having desired thickness and width dimensions can be obtained even in the case where a thin blank is used.

In the preforming roller die of a further aspect of the invention, a groove having a width that is larger than a thickness of a blank is formed in an outer peripheral face in a circumferential direction, and a groove forming blade portion protrudes in the circumferential direction on an inner bottom portion of the groove. When the preforming roller die is used, a preforming process in which the groove and the groove forming blade portion are pressed against an outer peripheral portion of the blank to form an outer peripheral groove in the whole outer peripheral portion of the blank can be performed easily and surely. Preferably, the groove may be formed into a V-like section shape which is gradually expanded as moving toward an outside.

The further aspect of the invention is a method of producing a brake shoe by using a disk-like metal blank, the brake shoe having a shoe rim which has a partially arcuate shape, and a shoe rib which protrudes from an inner periphery of the shoe rim, the method including: a preforming step of forming an outer peripheral groove in a whole outer peripheral portion of the blank; an expandingly forming step of expanding the outer peripheral groove of the blank in a thickness direction to form a web and a rim; a step of forming the brake shoe from the web and the rim. In the preforming step, a preforming roller die in which a groove having a width that is larger than the thickness of the blank is formed in an outer peripheral face in a circumferential direction and a groove forming blade portion which protrudes in the circumferential direction on an inner bottom portion of the groove is used, and the groove and the groove forming blade portion of the roller die are pressed against an outer peripheral portion of the blank to form the outer peripheral groove in the entire outer peripheral portion of the blank by the groove forming blade portion. In the expandingly forming step, an expandingly forming roller die is used in which an expanding blade portion protrudes from an outer peripheral face in a circumferential direction, and the expanding blade portion of the roller die is pressed against the outer peripheral groove of the blank, whereby the web and the rim on an outer peripheral portion of the web are formed while slitting the outer peripheral portion of the blank in the thickness direction into two parts. In the brake shoe forming step, the web and the rim are cut into a required shape, thereby forming a brake shoe having a shoe rim which has a partially arcuate shape, and a shoe rib which protrudes from an inner periphery of the shoe rim.

According to the method of producing a brake shoe, a brake shoe having a shoe rim which has a partially arcuate shape, and a shoe rib which protrudes from an inner periphery of the shoe rim can be easily produced from a disk-like metal blank.

BEST MODE FOR CARRYING OUT THE INVENTION

Description of Preferred Embodiments

Figure 1A:
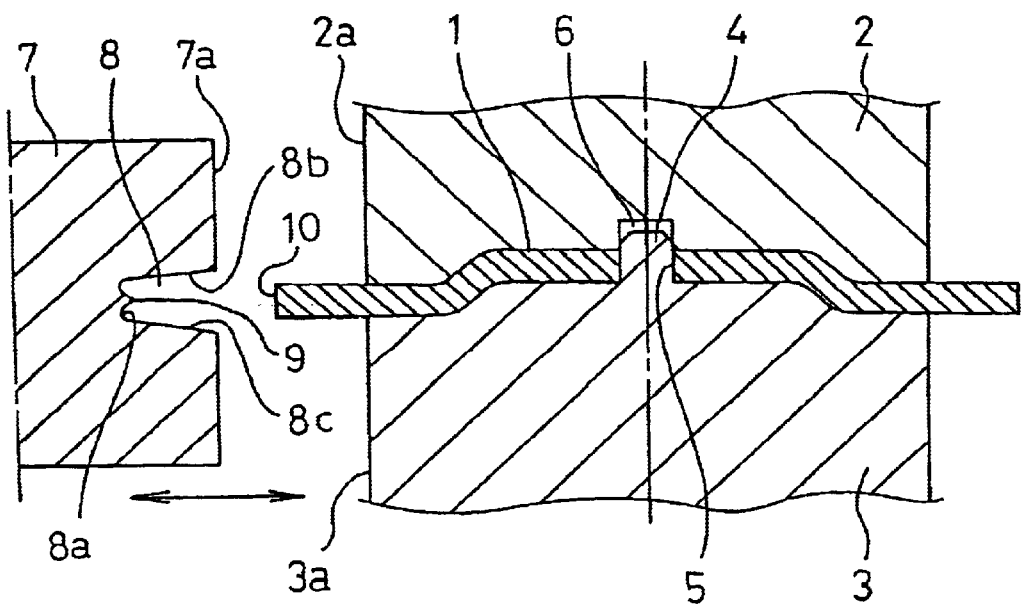
FIG. 1A is a diagram illustrating a state before a preforming process in a preforming step in the rim rolling method.

In the rim rolling method of the invention, a metal blank such as a steel plate which is formed into a disk-like shape by a process forming is used. In a preforming step, first, a blank 1 is clampingly held between a rotary upper die 2 and a rotary lower die 3 as shown in FIG. 1A. A protrusion 4 disposed at the axial center of the rotary lower die 3 is passed through a center hole 5 of the blank 1 and then fitted into a center recess 6 of the rotary upper die 2. An outer peripheral portion 10 of the blank 1 protrudes outwardly by a predetermined distance from outer peripheral faces 2a, 3a of the rotary upper and lower dies 2, 3.

In the preforming step, a preforming roller die 7 is prepared. In the preforming roller die 7, a groove 8 having a width that is larger than the thickness of the blank 1 is formed in an outer peripheral face 7a in the circumferential direction, and a groove forming blade portion 9 having a small V-like section shape protrudes in the circumferential direction on an inner bottom portion 8a of the groove 8.

The groove 8 is formed into a V-like section shape by inclinedly forming inner side faces 8b, 8c so as to be gradually expanded as moving toward the outside, thereby facilitating insertion to the outer peripheral portion 10 of the blank 1 during the preforming process. Alternatively, the groove 8 may be formed into a U-like section shape so that both the inner side faces 8b, 8c are perpendicular to the axis to be parallel to each other, and opening edges of the inner side faces 8b, 8c may be rounded.

Figure 1B:
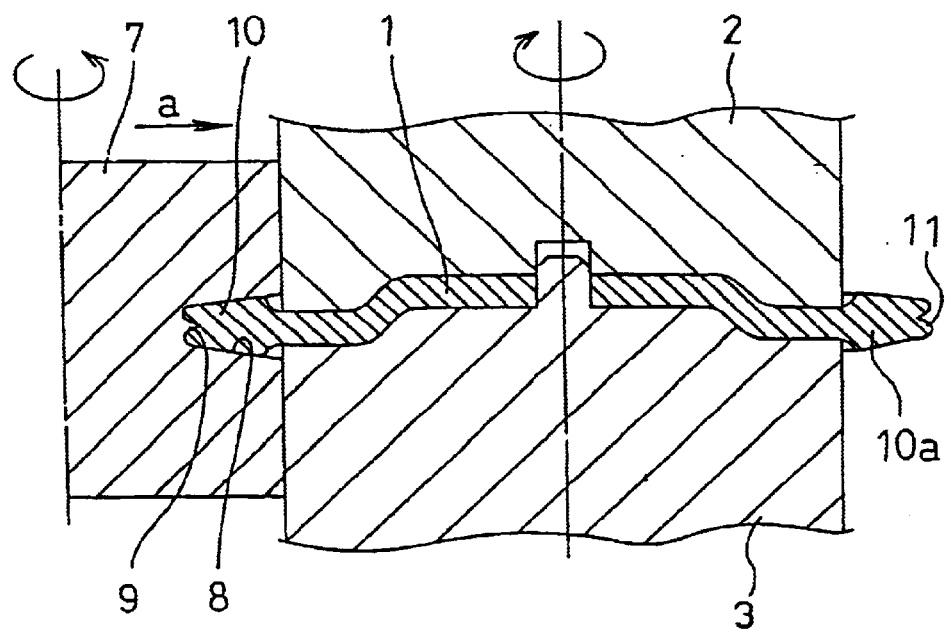
FIG. 1B is a diagram illustrating the operation of the preforming step in the rim rolling method.

In the preforming process, the preforming roller die 7 is moved to approach the outer peripheral portion 10 of the blank 1 as indicated by the arrow a in FIG. 1B. While pressing the groove 8 and the groove forming blade portion 9 against the outer peripheral portion 10 of the blank 1, the preforming roller die 7 and the blank 1 are synchronously rotated, to form an outer peripheral groove 11 in the outer peripheral portion 10 of the blank 1 by the groove forming blade portion 9.

In the case where the used blank 1 is thin and hence the outer peripheral portion 10 is to be thickened in the groove 8, the width and the depth of the groove 8 are set to dimensions which enable the portion to be thickened, so that the portion can be easily thickened by material flow which is caused in the groove 8 in accordance with the pressing of the preforming roller die 7. In this case, when the groove 8 is formed into a V-like section shape, the outer peripheral portion 10 can be thickened so that the root portion 10a of the outer peripheral portion 10 is thickest.

Figure 2A:
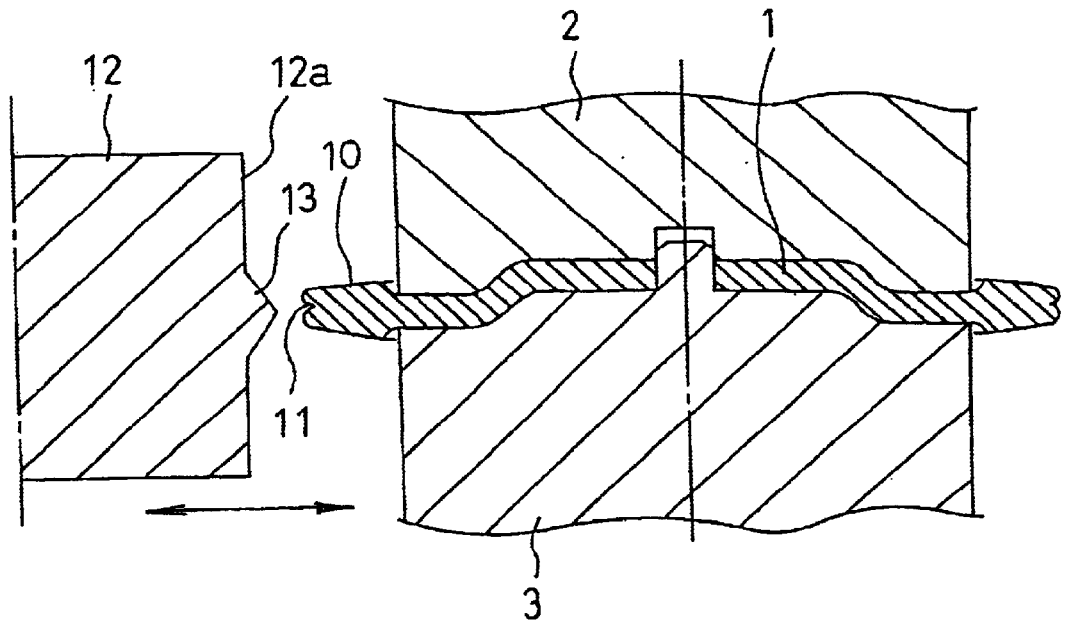
FIG. 2A is a diagram illustrating a state before an expandingly forming process in an expandingly forming step in the rim rolling method.
Figure 2B:
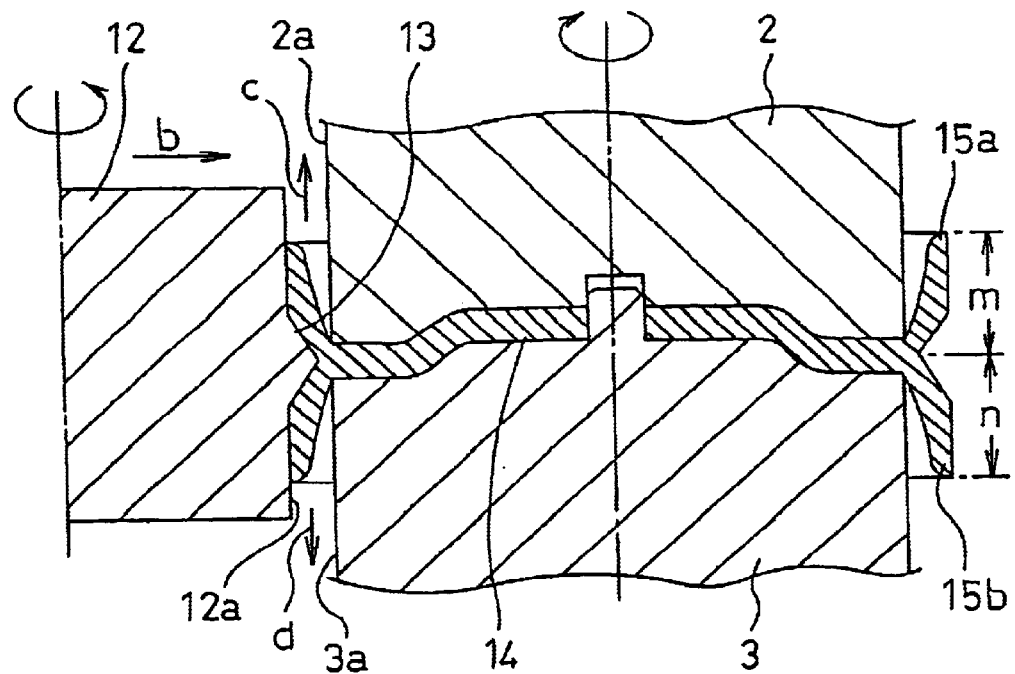
FIG. 2B is a diagram illustrating the operation of the expandingly forming step in the rim rolling method.

The blank 1 in which the outer peripheral groove 11 is formed in the outer peripheral portion 10 is then subjected to an expandingly forming step. An expandingly forming roller die 12 in which an expanding blade portion 13 having a V-like section shape protrudes in the circumferential direction on an outer peripheral face 12a is moved to approach the outer peripheral portion 10 of the blank 1 as indicated by the arrow b in FIG. 2B, and the expanding blade portion 13 is pressed against the outer peripheral groove 11 of the blank 1, whereby while slitting the outer peripheral portion 10 of the blank 1 into two parts in the thickness direction, the material is caused to flow toward both sides c, d in the thickness direction between the outer peripheral face 12a of the expandingly forming roller die 12 and the outer peripheral faces 2a, 3a of the rotary upper and lower dies 2, 3, so that a web 14, and rims 15a, 15b which annularly expand toward both sides in the thickness direction of the outer peripheral portion of the web 14 are formed.

Figure 5:
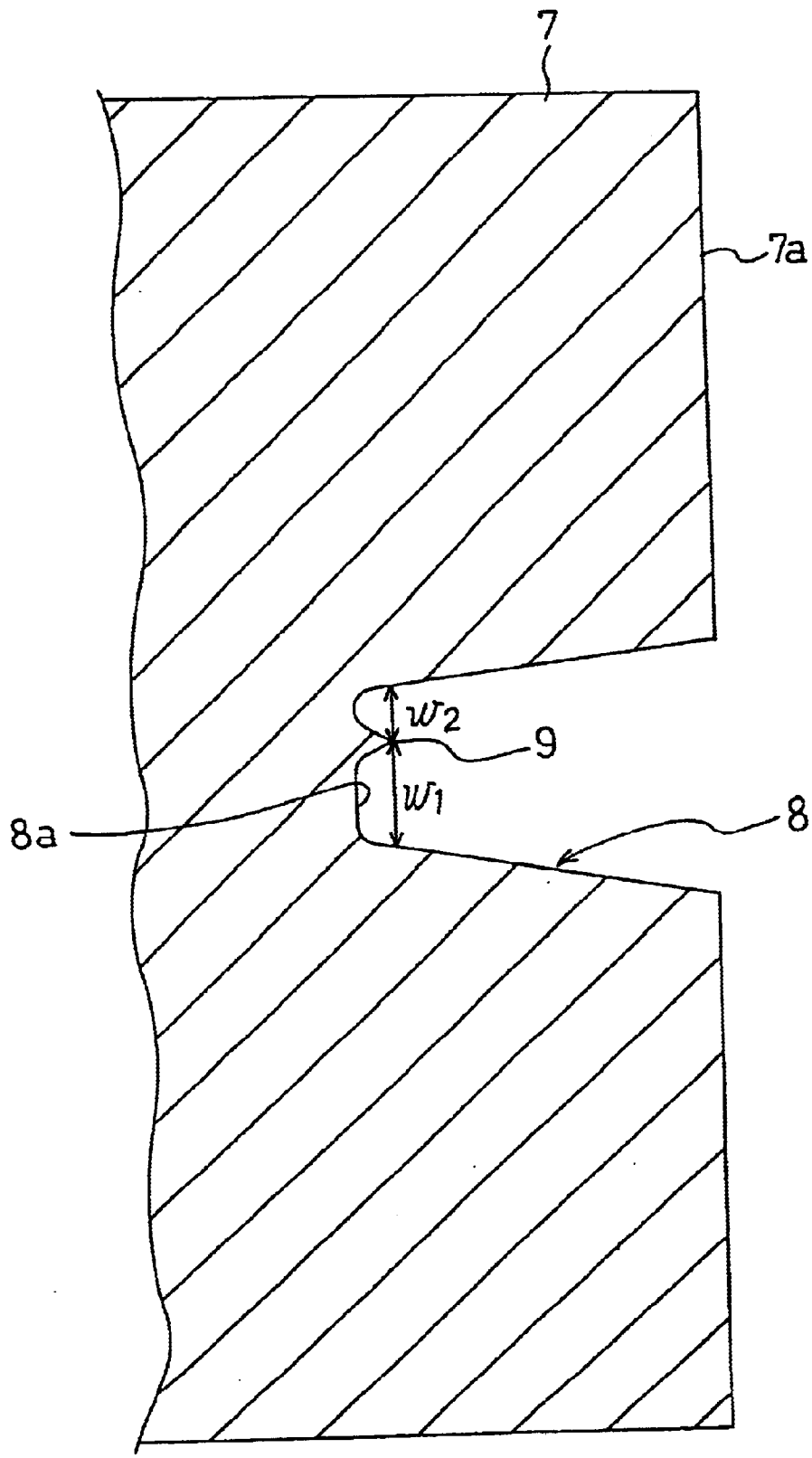
FIG. 5 is a partial section view showing another example of a preforming roller die.

In the case where the expanding formation is to be performed so that the width m of the rim 15a in one side of the web 14 is equal to the width n of the rim 15b in the other side, the groove forming blade portion 9 of the preforming roller die 7 is formed in the center position in the groove width direction of the inner bottom portion 8a of the groove 8, and the outer peripheral groove 11 is formed by the preforming process in the center position in the thickness direction of the outer peripheral portion 10 of the blank 1. In the case where the expanding formation is to be performed so that the width m of the rim 15a in the one side is different from the width n of the rim 15b in the other side, the groove forming blade portion 9 of the preforming roller die 7 is formed in a position which is deviated toward one side in the groove width direction from the center position in the groove width direction of the inner bottom portion 8a of the groove 8, and the outer peripheral groove 11 is formed by the preforming process in a position which is deviated toward the one side in the groove width direction from the center position in the thickness direction of the outer peripheral portion 10 of the blank 1. As shown in FIG. 5, for example, the groove forming blade portion 9 of the preforming roller die 7 may be formed in a position of the inner bottom portion 8a of the groove 8 at which $w_1:w_2$ is 2:1. In this example, the expanding formation can be performed so that the ratio of the width m of the rim 15a in one side of the web 14 to the width n of the rim 15b in the other side is set to 1:2 by the expanding formation.

Figure 3A:
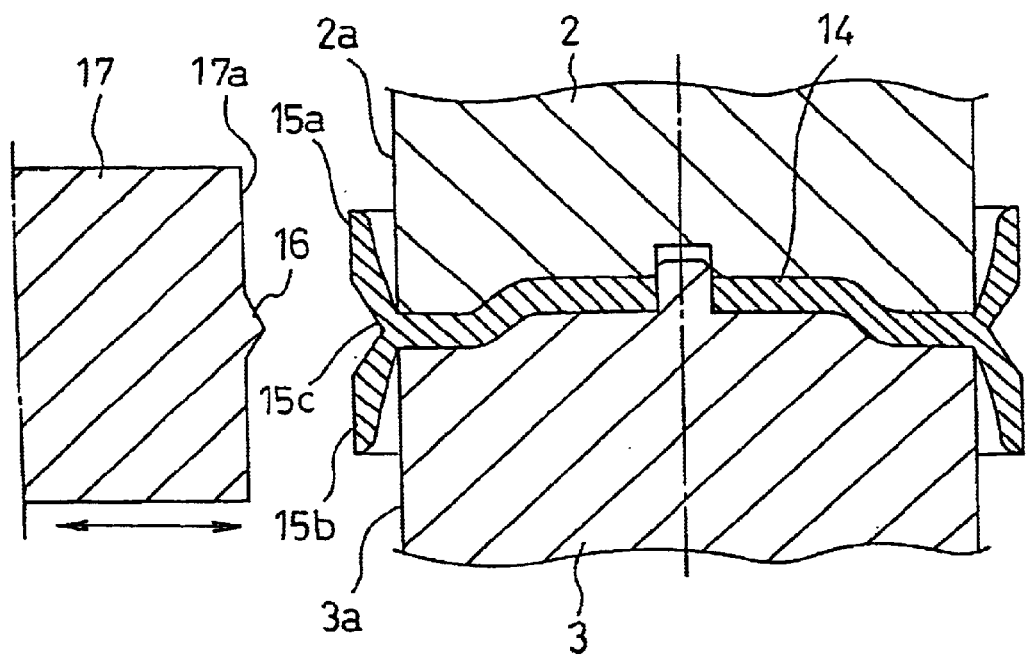
FIG. 3A is a diagram illustrating a state before a prefinishing process in a prefinishing step in the rim rolling method.
Figure 3B:
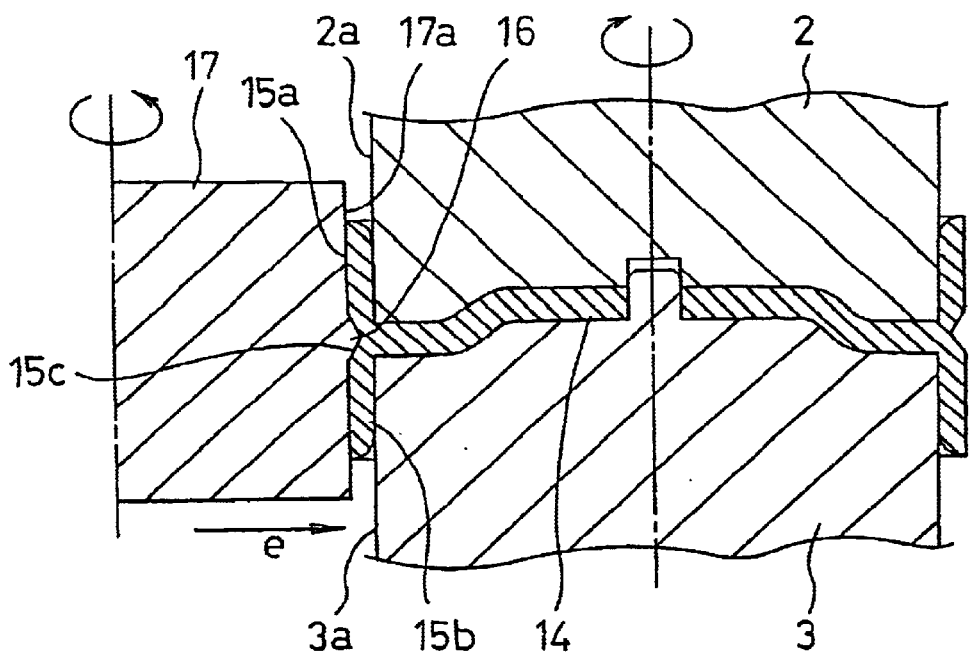
FIG. 3B is a diagram illustrating the operation of the prefinishing step in the rim rolling method.

In the case where one expandingly forming process is insufficient for sufficiently attaining perpendicularity and thickness evenness of the rims 15a, 15b with respect to the web 14, one or two or more expandingly forming processes are further performed as a prefinishing step. In the prefinishing step, an expandingly forming roller die 17 is used in which, as shown in FIG. 3A, an expanding blade portion 16 that is smaller than the expanding blade portion 13 having a V-like section shape of the expandingly forming roller die 12 is formed on the outer peripheral face 17a. The expandingly forming roller die 17 is moved to approach the rims 15a, 15b as indicated by the arrow e in FIG. 3B, and the expanding blade portion 16 is pressed against a recess 15c portion in the center of the rims 15a, 15b, whereby the rims 15a, 15b are shaped so as to be perpendicular to the web 14 and have a uniform thickness between the outer peripheral face 17a of the expandingly forming roller die 17 and the outer peripheral faces 2a, 3a of the rotary upper and lower dies 2, 3.

Figure 4A:
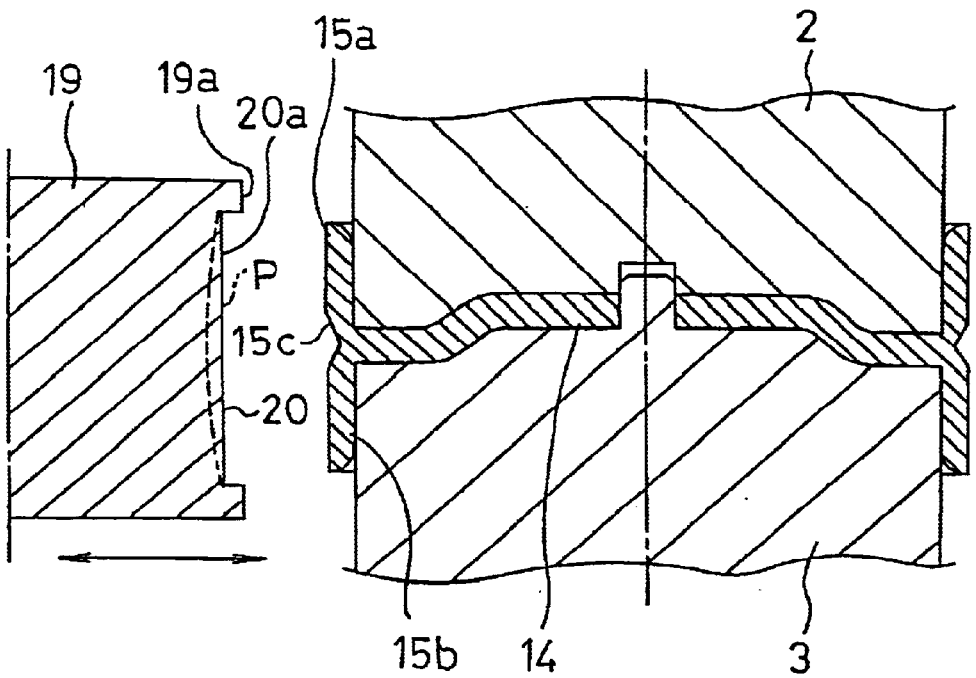
FIG. 4A is a diagram illustrating a state before a finishing process in a finishing step in the rim rolling method.
Figure 4B:
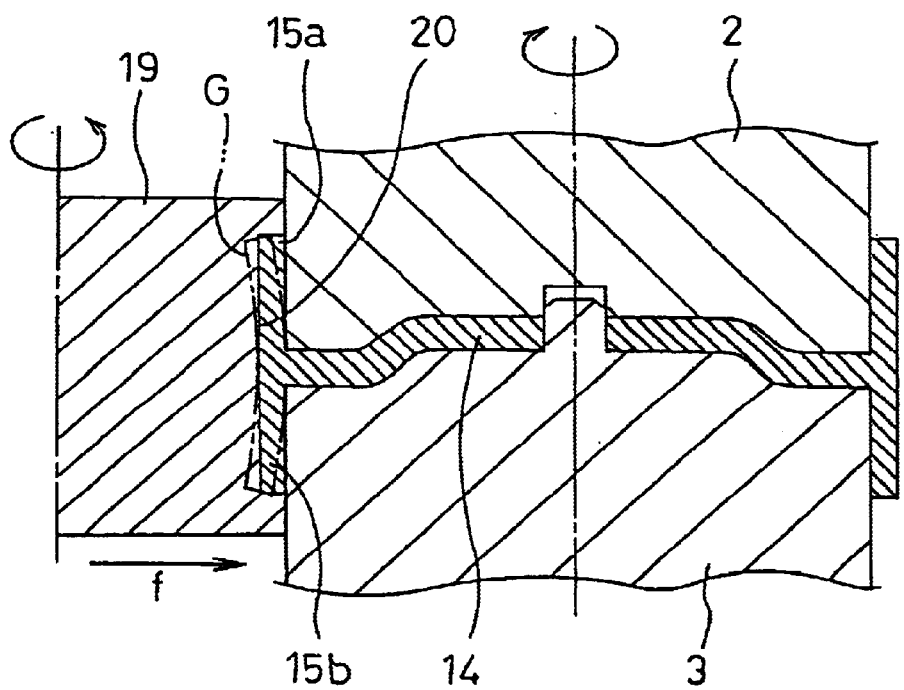
FIG. 4B is a diagram illustrating the operation of the finishing step in the rim rolling method.

In the finishing step, as shown in FIG. 4A, a finishing roller die 19 is used in which a width rectifying groove 20 is formed in an outer peripheral face 19a in the circumferential direction. The finishing roller die 19 is moved to approach the rims 15a, 15b as indicated by the arrow f in FIG. 4B, and the width rectifying groove 20 is pressed against the rims 15a, 15b, whereby the rims 15a, 15b are finished so as to have a predetermined width dimension. In the case where the recess 15c remains in the center of the rims 15a, 15b as shown in FIG. 4A even after the previous step, also a process of eliminating the recess 15c is performed. Preferably, the inner bottom face 20a of the width rectifying groove 20 is rounded to a radius of about 200 mm (see the broken line P in FIG. 4A) rather than that the inner bottom face is formed as a perpendicular face parallel to the axis, because the rims 15a, 15b can be prevented from being warped by residual stress as indicated by the phantom line G (see FIG. 4B), so as to be finished straight in the width direction.

Figure 6:
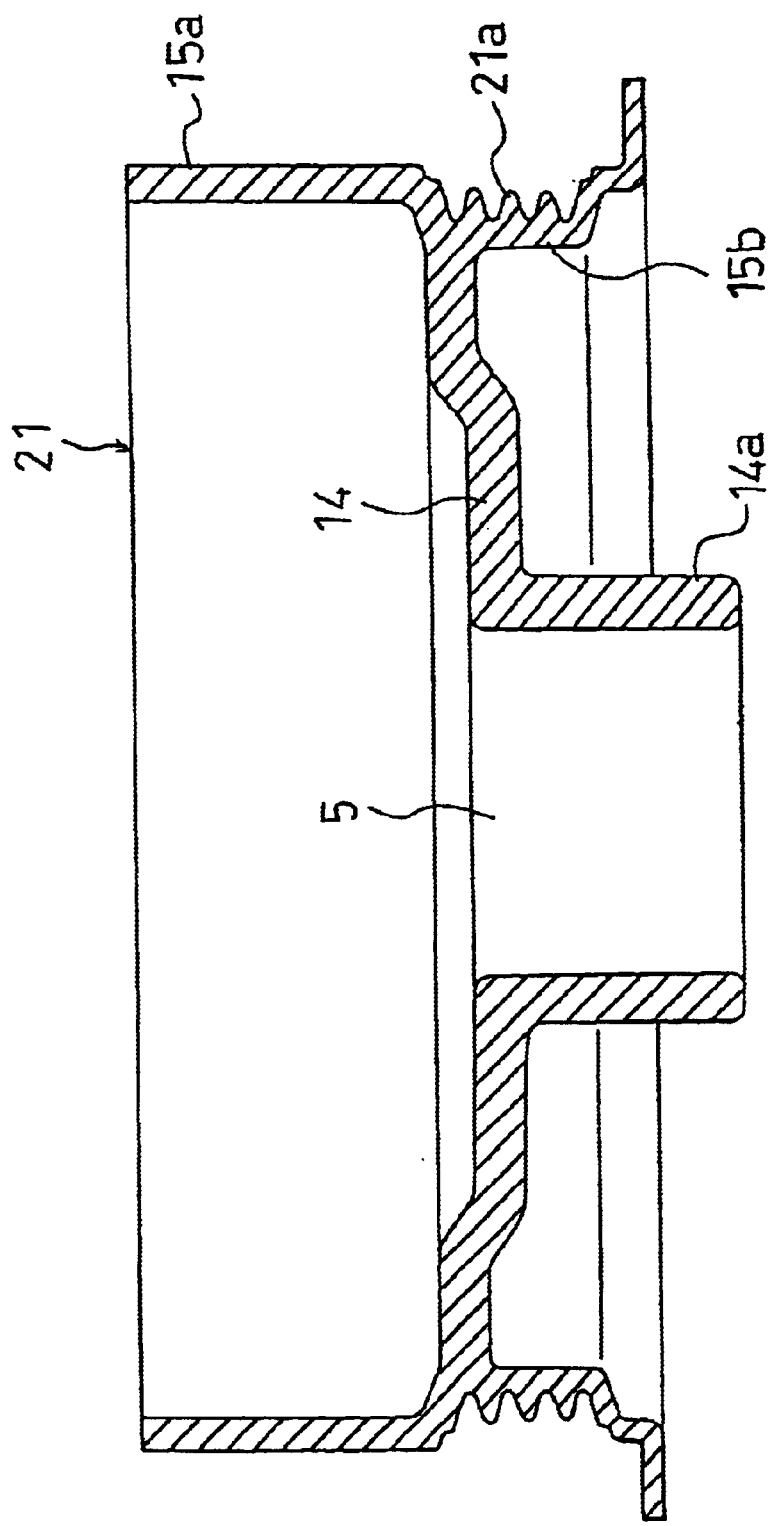
FIG. 6 is a section view of a poly-V pulley which is obtained from a rim rolled product.
Figure 7:
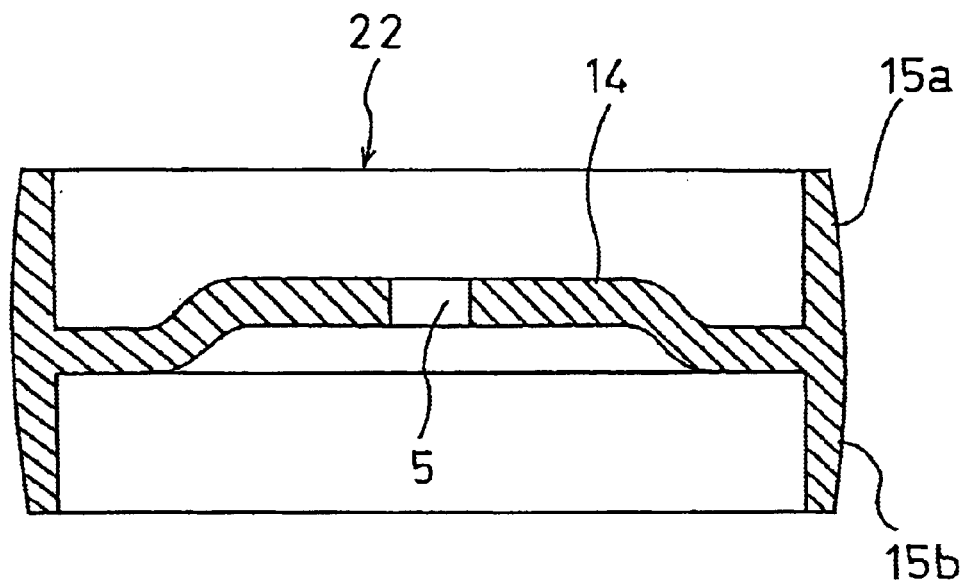
FIG. 7 is a section view of a back face pulley which is obtained from a rim rolled product.
Figure 8:
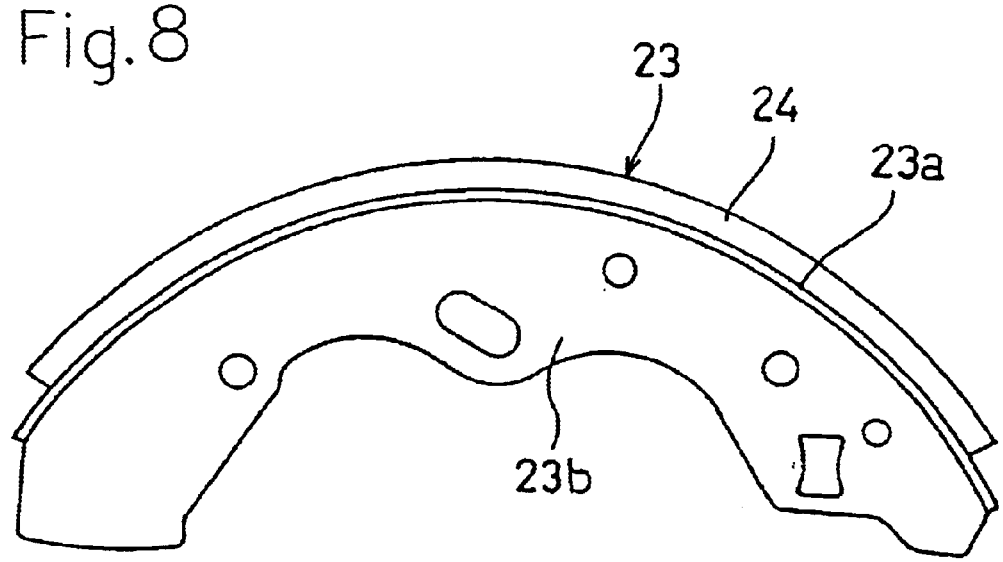
FIG. 8 is a section view of a brake shoe which is obtained from a rim rolled product.

The rim rolled product in which the rims 15a, 15b are formed on the outer periphery of the web 14 can be further processed in the next step in the following manner. For example, a single V-groove may be formed in the outer periphery of the rims 15a, 15b to produce a sheet metal V-pulley (not shown), or poly-V grooves 21a may be formed in one of or both of the rims 15a, 15b as shown in FIG. 6 to produce a sheet metal poly-V-pulley 21. As a rim rolled product which is used for producing the sheet metal poly-V-pulley 21 shown in FIG. 6, a product in which a boss 14a surrounding the center hole 5 is formed in the center of the web 14 is used. Alternatively, in the above-mentioned rim rolled product, the outer peripheral faces of the rims 15a, 15b may be finished into a convex arcuate shape as shown in FIG. 7 so as to produce a sheet metal back face pulley 22. As shown in FIG. 8, furthermore, a sheet metal brake shoe 23 may be produced.

The case where the above-mentioned rim rolled product is produced into the sheet metal brake shoe 23 shown in FIG. 8 to be used in a drum brake will be described.

Figure 9:
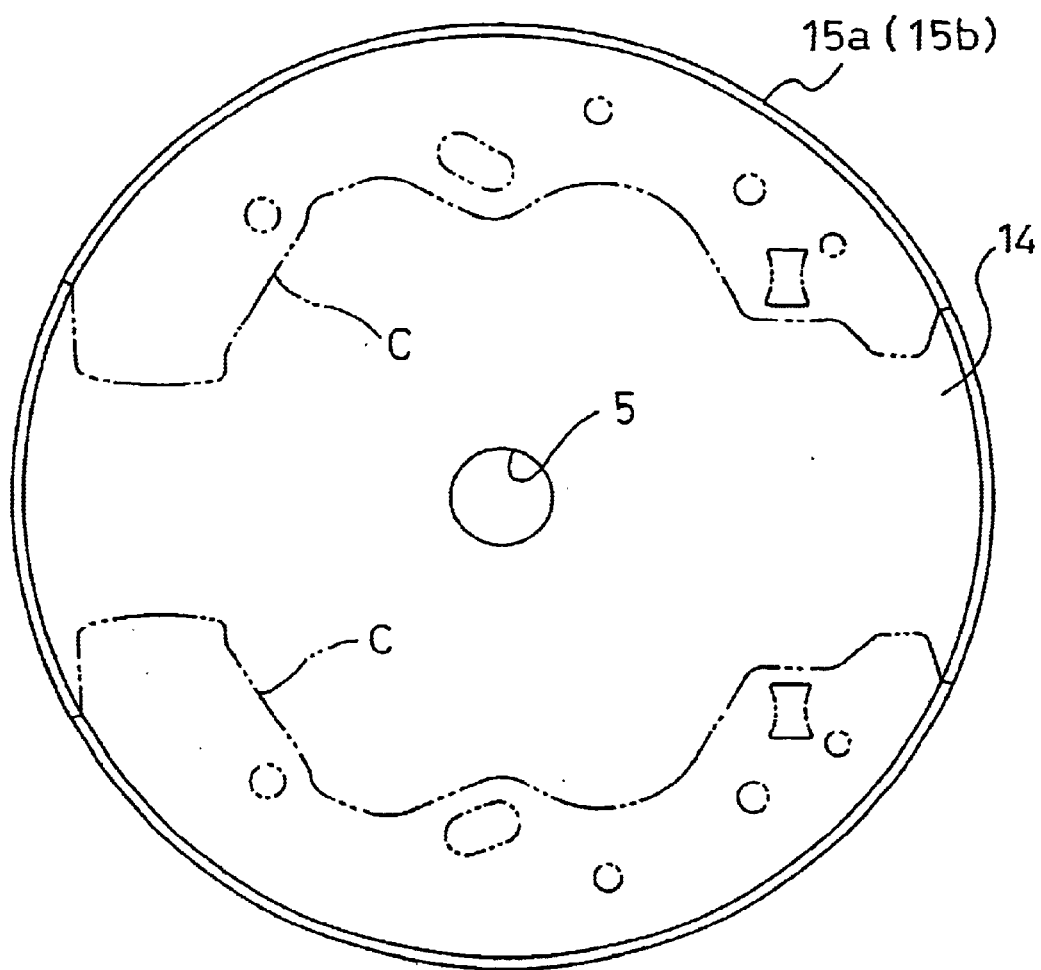
FIG. 9 is a front view illustrating a cutting step in steps of producing the brake shoe shown in FIG. 8.

As shown in FIG. 9, the above-mentioned rim rolled product in which the rims 15a, 15b are formed on the outer periphery of the web 14 is cut into a desired shape along the cutting plane line C by laser or plasma cutting. As a result, it is possible to easily obtain the sheet metal brake shoe 23 having a shoe rim 23a which has a partially arcuate shape configured by parts of the rims 15a, 15b as shown in FIG. 8, and a shoe rib 23b which is protruded from the inner periphery of the shoe rim 23a, and which is configured by a part of the web 14. As shown in FIG. 8, thereafter, a friction lining 24 is bonded to the outer face of the shoe rim 23a of the brake shoe 23. In order to enhance the bonding strength of the friction lining 24, a knurling process is preferably applied to the outer face of the shoe rim 23a before the process of bonding the friction lining 24.

According to the invention set forth in claim 1, the expanding blade portion of the expandingly forming roller die can be pressed against the outer peripheral groove without slipping over the outer peripheral face of a blank, thereby expandingly forming it. Therefore, the outer peripheral face of the blank can be correctly slit at a arbitrary position in the thickness direction, so that the accuracy and quality of a rim rolled product can be improved.

According to the invention, a rim having desired thickness and width dimensions can be obtained even in the case where a thin blank is used.

According to the invention, a preforming process of forming an outer peripheral groove in the whole outer peripheral portion of a blank can be performed easily and surely.

According to the invention, a brake shoe having a shoe rim which has a partially arcuate shape, and a shoe rib which is protruded from an inner periphery of the shoe rim can be easily produced.

What is claimed is:

1. A rim rolling method which operates on a metal blank, the metal blank having an outer peripheral portion and a thickness, the method comprising the steps of:

forming a groove having a width that is larger than the thickness of the metal blank in an outer peripheral face in a circumferential direction of a preforming roller die, and in which a groove forming blade portion protrudes in the circumferential direction on an inner bottom portion of the groove;

pressing the preforming roller die with the groove and the groove forming blade portion against the outer peripheral portion of the metal blank to form an outer peripheral groove in the entire outer peripheral portion of the metal blank by the groove forming blade portion; and pressing an expanding blade portion of an expandingly forming roller die, which expanding blade portion protrudes from an outer peripheral face in a circumferential direction, against the outer peripheral groove of the metal blank, whereby a rim is expandingly formed while slitting the outer peripheral portion of the metal blank into two parts in the thickness direction.

2. A rim rolling method which operates on a metal blank having an outer peripheral portion and a thickness, comprising the steps of:

forming a groove having a width that is larger than the thickness of the metal blank in an outer peripheral face in a circumferential direction of a preforming roller die, and in which a groove forming blade portion protrudes in the circumferential direction on an inner bottom portion of said groove;

pressing the preforming roller die with the groove and the groove forming blade portion against the outer peripheral portion of the metal blank to thicken the outer peripheral portion of the metal blank in the groove, and to form an outer peripheral groove in the entire outer peripheral portion of the thickened portion by the groove forming blade portion; and pressing an expanding blade portion of an expandingly forming roller die, which expanding blade portion protrudes from an outer peripheral face in a circumferential direction, against the outer peripheral groove of the metal blank, whereby a rim is expandingly formed while slitting the outer peripheral portion of the metal blank into two parts in the thickness direction.

3. A method which operates on a metal blank having an outer peripheral portion and a thickness to produce a brake shoe having a shoe rim which has a partially arcuate shape, and a shoe rib which protrudes from an inner periphery of the shoe rim, said method comprising the steps of:

forming a groove having a width that is larger than the thickness of the metal blank in an outer peripheral face in a circumferential direction of a peripheral roller die, and in which a groove forming blade portion protrudes in the circumferential direction on an inner bottom portion of the groove;

pressing the preforming roller die with the groove and the groove forming blade portion against the outer peripheral portion of the metal blank to form an outer peripheral groove in the entire outer peripheral portion of the metal blank by the groove forming blade portion;

pressing an expanding blade portion of an expandingly forming roller die, which expanding blade portion protrudes from an outer peripheral face in a circumferential direction, against the outer peripheral groove of the metal blank, whereby a rim is expandingly formed on a web and an outer peripheral portion of the web while slitting the outer peripheral portion of the metal blank into two parts in the thickness direction; and cutting the web and the rim into a required shape, thereby forming the brake shoe.

* * * * *